United States Patent
Imanishi (10) Patent No.: US 10,625,420 B2
(45) Date of Patent: Apr. 21, 2020

(54) MACHINING SYSTEM

(71) Applicant: Fanuc Corporation, Yamanashi (JP)

(72) Inventor: Kazutaka Imanishi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 63 days.

(21) Appl. No.: 16/169,697

(22) Filed: Oct. 24, 2018

(65) Prior Publication Data

US 2019/0126480 A1 May 2, 2019

(30) Foreign Application Priority Data

Nov. 1, 2017 (JP) ................................. 2017-211899

(51) Int. Cl.
| | |
|---|---|
| *B25J 9/16* | (2006.01) |
| *B25J 9/00* | (2006.01) |
| *G05B 19/418* | (2006.01) |
| *G05B 19/4061* | (2006.01) |

(52) U.S. Cl.
CPC ........... *B25J 9/1666* (2013.01); *B25J 9/0096* (2013.01); *G05B 19/4061* (2013.01); *G05B 19/41825* (2013.01); *G05B 2219/40476* (2013.01)

(58) Field of Classification Search
CPC ... B25J 9/1666; B25J 9/0096; G05B 19/4061; G05B 2219/40476; G05B 19/41825
See application file for complete search history.

(56) References Cited

U.S. PATENT DOCUMENTS 4,359,815 A * 11/1982 Toyoda .............. B23Q 3/15713
414/225.01
2005/0256606 A1    11/2005 Irri et al.
(Continued)

FOREIGN PATENT DOCUMENTS

| JP | H07-244512 A | 9/1995 |
| JP | H10-105217 A | 4/1998 |

(Continued)

OTHER PUBLICATIONS

Usui, Takumi; Notice of Reasons for Refusal for Japanese Application No. 2017-211899; dated Aug. 27, 2019; 4 pages.
(Continued)

*Primary Examiner* — Jason Holloway
(74) *Attorney, Agent, or Firm* — Winstead PC (57) ABSTRACT

A machining system has a machine tool, a numerical controller which moves a machining table of the machine tool according to a machining program, a robot which performs a process to a work on the machining table, and a robot control unit, and the numerical controller is configured to send a current position coordinate of the machining table, a prefetched position coordinate of the machining table, which is calculated by prefetching the machining program and carrying out an acceleration and deceleration interpolation, and time information, which corresponds to the current position coordinate and the prefetched position coordinate, to the robot control unit, and the robot control unit controls the robot so that the distal end portion of the robot follows the movement of the machining table by using the current position coordinate, the prefetched position coordinate, and the time information, which are received from the numerical controller.

5 Claims, 8 Drawing Sheets

(56) References Cited

U.S. PATENT DOCUMENTS

| | | | | |
|---|---|---|---|---|
| 2015/0177728 A1* | 6/2015 | Haraguchi | ............ | G05B 19/19 |
| | | | | 700/193 |
| 2016/0375582 A1 | 12/2016 | Nakajima et al. | | |
| 2017/0050282 A1 | 2/2017 | Kruck | | |
| 2018/0021096 A1* | 1/2018 | Kostrzewski | .......... | A61B 34/30 |
| | | | | 606/130 |
| 2018/0067467 A1* | 3/2018 | Okuzono | ......... | G05B 19/41825 |

FOREIGN PATENT DOCUMENTS

| | | | |
|---|---|---|---|
| JP | 2009-279608 A | 12/2009 |
| JP | 2011-048467 A | 3/2011 |
| JP | 2017-016228 A | 1/2017 |
| JP | 2017-514714 A | 6/2017 |

OTHER PUBLICATIONS

Industrial Property Cooperation Center; Search Report by Registered Search Organization; dated Jul. 19, 2019; 7 pages.

* cited by examiner

MACHINING SYSTEM

CROSS-REFERENCE TO RELATED APPLICATIONS

This application is based on and claims priority to Japanese Patent Application No. 2017-211899 filed on Nov. 1, 2017, the entire content of which is incorporated herein by reference.

TECHNICAL FIELD

This invention relates to a machining system, and more specifically, to a machining system using a machine tool and a robot.

BACKGROUND ART

As this kind of machining system, a machining system which is configured so that prefetched movement data of a machine tool obtained by prefetching a machining program of a numerical controller and carrying out an interpolation calculation on the machining program, and status data of a robot recognized by a robot controller are sent to an interference checking device, and interference between the machine tool and the robot is checked by the interference checking device is known. (See PTL 1, for example.)

Also, a machining system which includes a numerical controller having an internal clock, a robot controller having an internal clock, and a reference clock, and which synchronizes the machine tool to the robot is also known. (See PTL 2, for example.) With this machining system, the numerical controller and the robot controller are configured to operate so that the time of their internal clocks respectively correspond to that of the reference clock, and on the other hand, the numerical controller and the robot controller are configured to adjust the time of the reference clock so as to correspond to that of their internal clocks when the time of the internal clocks thereof failed to correspond to that of the reference clock.

CITATION LIST

Patent Literature

{PTL 1}
Japanese Unexamined Patent Application, Publication No. 2017-16228
{PTL 2}
Japanese Unexamined Patent Application, Publication No. 2009-279608

SUMMARY OF INVENTION

A first aspect of the present invention is a machining system including, a machine tool which processes a work positioned on a machining table; a numerical controller which stores a machining program and which moves the machining table according to the machining program; a robot which performs a predetermined process on the work which are processed by the machine tool; and a robot control unit which controls the robot, wherein the numerical controller is configured to obtain current position coordinates of the machining table, and calculates prefetched position coordinates of the machining table at a prefetching time by prefetching the machining program and carrying out an acceleration and deceleration interpolation while the machining table is moving, and which sends, to the robot control unit, the current position coordinates, the prefetched position coordinates, and information of times which respectively correspond to the current position coordinates and the prefetched position coordinates, and the robot control unit controls the robot so that a distal end portion of the robot follows movement of the machining table by using the current position coordinates, the prefetched position coordinates, and the information of the times, which the robot control unit receives from the numerical controller.

DESCRIPTION OF EMBODIMENTS

A machining system according to an embodiment of the present invention will be described below with reference to the accompanying drawings.

Figure 1:
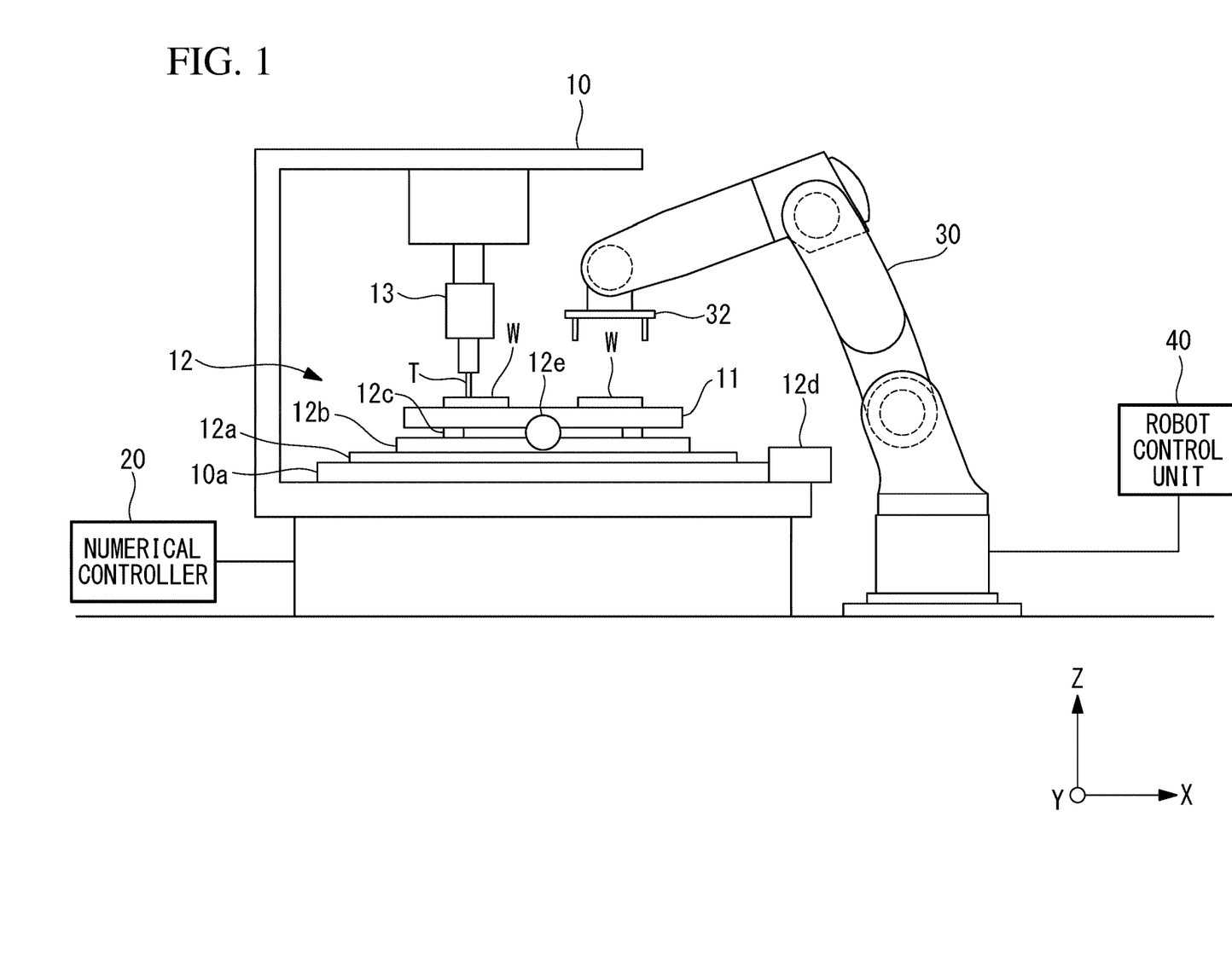
FIG. 1 is a schematic front view of a machining system according to an embodiment of the present invention.

This machining system includes a machine tool 10, such as NC machine tool, and the like, for machining works W which are held on a machining table 11, a numerical controller 20 which stores a machining program 23b (refer to FIG. 3), and which moves the machining table 11 according to the machining program 23b, a robot 30 which performs a predetermined process to the works W, which are machined by the machine tool 10, and a robot control unit 40 which controls the robot 30.

Figure 2:
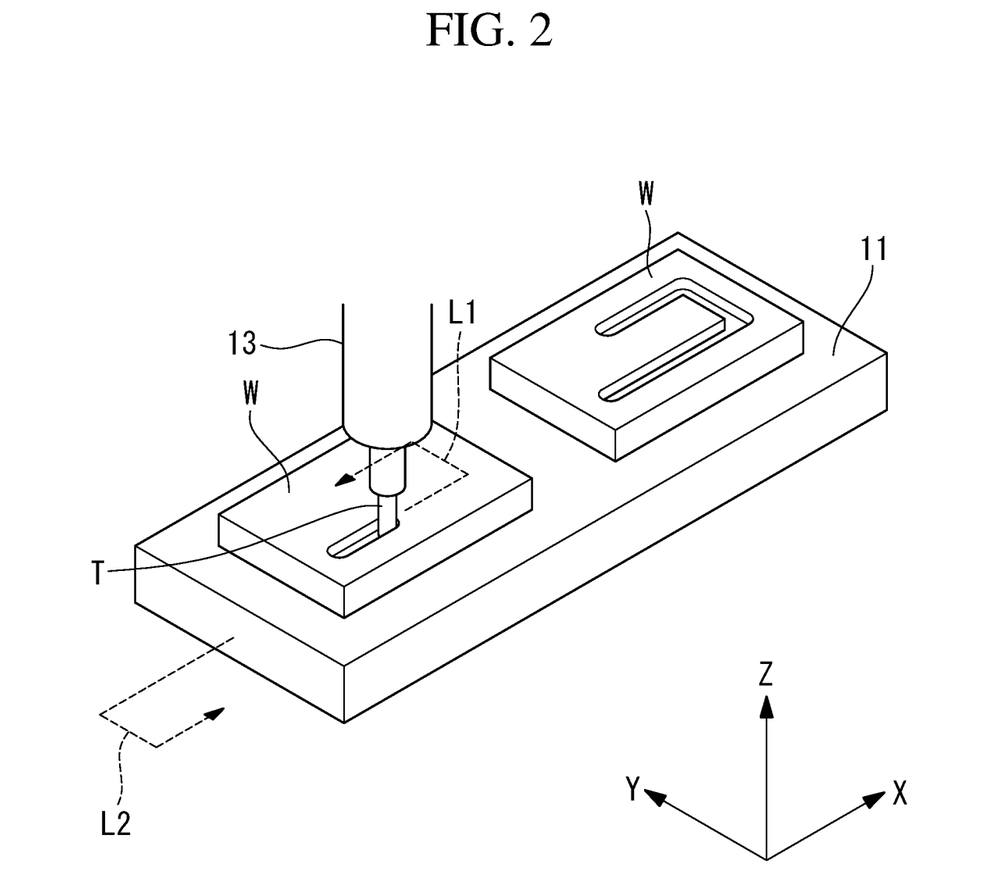
FIG. 2 is a perspective view of a main part of a machine tool of the machining system of the embodiment.

The machine tool 10 has a machining table 11, a table moving apparatus 12 which moves the machining table 11 along a X direction (a horizontal direction) and a Y direction (a horizontal direction), which is perpendicular to the X direction, and a tool driving device 13 which is placed at an upper side of the machining table 11, and which holds and drives a cutting tool T, such as a milling cutter, a drill, and the like, in purpose of machining. The machining table 11 has a known structure, and the works W are positioned or fixed on the machining table 11 directly or by means of a jig, or the like. In this embodiment, the works W are positioned at two positions, respectively, which are aligned on the machining table 11 in the X direction.

The table moving apparatus 12 has a rail 12a which is fixed to a main body 10a of the machine tool 10, and which extends along the X direction, a moving table 12b which is supported by the rail 12a so as to be movable in the X direction, and a rail 12c which is provided on the moving table 12b so as to extend along the Y direction, and the machining table 11 is supported on the rail 12c so as to be movable in the Y direction. The table moving apparatus 12 further includes a X-direction driving device 12d having a motor, an encoder, a ball screw, and the like, for moving the moving table 12b along the X direction, and a Y-direction driving device 12e having a motor, an encoder, a ball screw, and the like, for moving the machining table 11 along the Y direction with respect to the moving table 12b. Also, it may be configured that the table moving apparatus 12 moves the machining table 11 in a Z direction (a vertical direction) as well.

The X-direction driving device 12d, the Y-direction driving device 12e, and the tool driving device 13 are connected to the numerical controller 20, and are controlled by the numerical controller 20.

Figure 3:
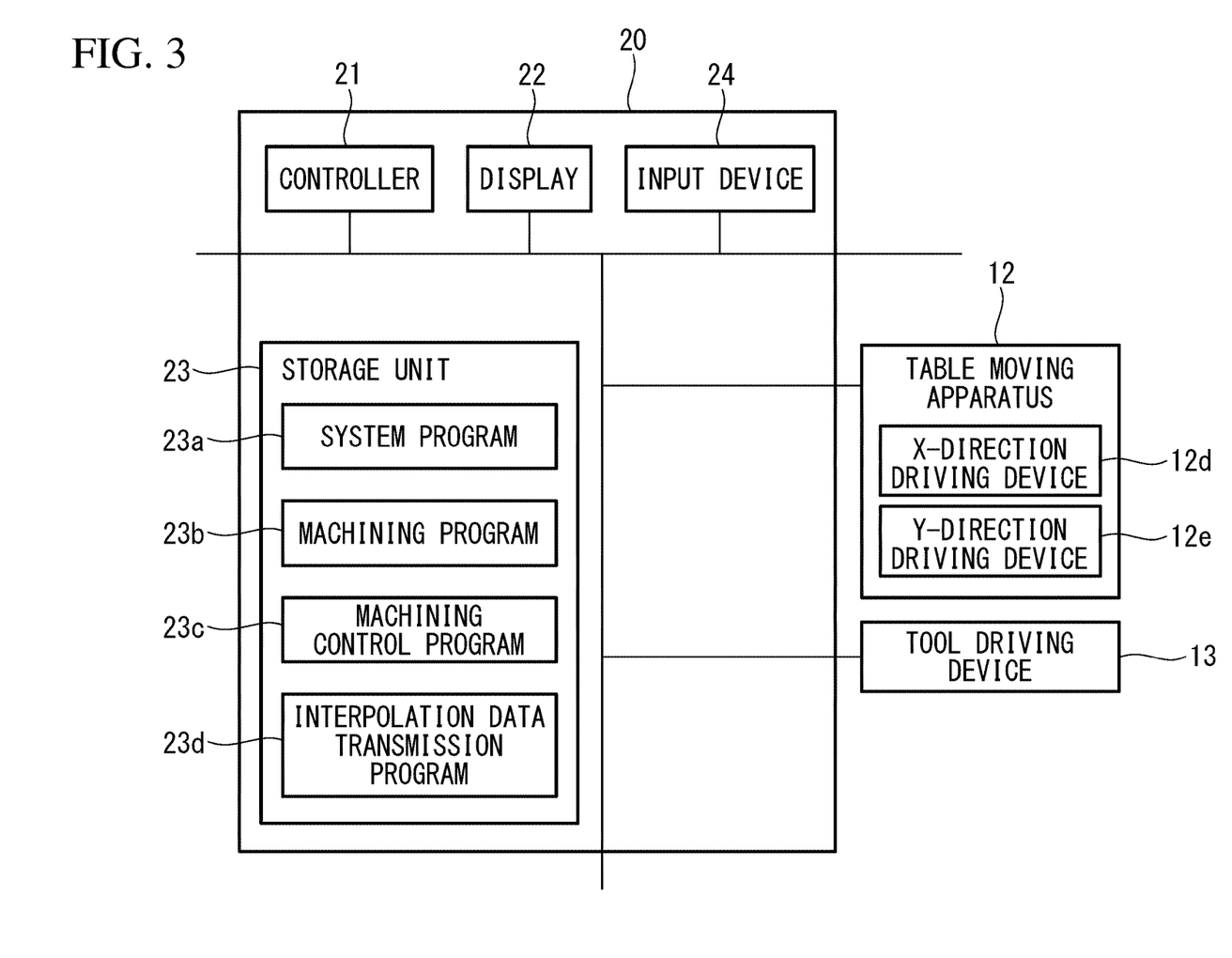
FIG. 3 is a block diagram of a numerical controller of the machining system of the embodiment.

As shown in FIG. 3, the numerical controller 20 includes a controller 21 having, for example, a CPU, a RAM, and the like, a display 22, a storage unit 23 having a non-volatile storage, a ROM, and the like, and an input device 24 having a touch panel, an input key, and the like. The input device 24 may be configured so that it can conduct wireless communication with the numerical controller 20.

A system program 23a is stored in the storage unit 23, and the system program 23a provides a basic function of the numerical controller 20. Also, at least one machining program 23b for controlling the X-direction driving device 12d, the Y-direction driving device 12e, and the tool driving device 13 of the machine tool 10 in order to conduct the machining, is stored in the storage unit 23.

The machining program 23b is, for example, a set of commands which relatively moves a cutting tool T held by the tool driving device 13 and the work W held on the machining table 11 along a machining trajectory based on a CAD data, and the like, while controlling a rotation or the like of the cutting tool T. According to this embodiment, when the work W is machined along a machining trajectory L1 shown in FIG. 2, the machining table 11 moves in the X direction and the Y direction with regard to the cutting tool T along a trajectory L2.

A machining control program 23c is also stored in the storage unit 23. The controller 21 is operated by the machining control program 23c so as to firstly obtain current position information (current position coordinate information) of the machining table 11 and time thereof. The position of the machining table 11 is obtained on the basis of detected data, and the like, of the encoder of the X-direction driving device 12d and the Y-direction driving device 12e, for example.

Also, the controller 21 is operated by the machining control program 23c, and the controller 21 prefetches commands of the machining program 23b, which are multiple blocks ahead of the current command, and obtains information of a cutting starting point, a cutting end point, a cutting method (straight line, curved line, and the like), cutting depth, and the like of the respective machining trajectories included in the plurality of the commands, and according to this information, the controller 21 calculates machining detail information between the cutting starting point and the cutting end point. The machining detail information includes information calculated for each of the machining trajectories, that is, information of a moving position (a destination position) of the machining table 11 (prefetched position coordinate information), which moves between the cutting start point and the cutting end point per each of the predetermined prefetching times (interpolation processing).

Figure 4:
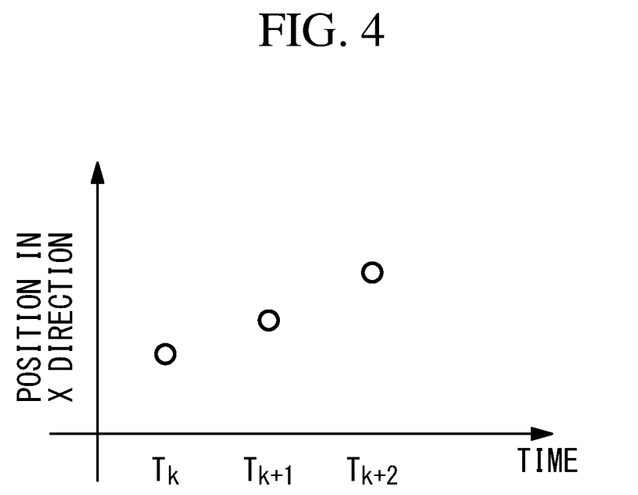
FIG. 4 is an example of interpolation data calculated by the numerical controller of the embodiment.
Figure 5:
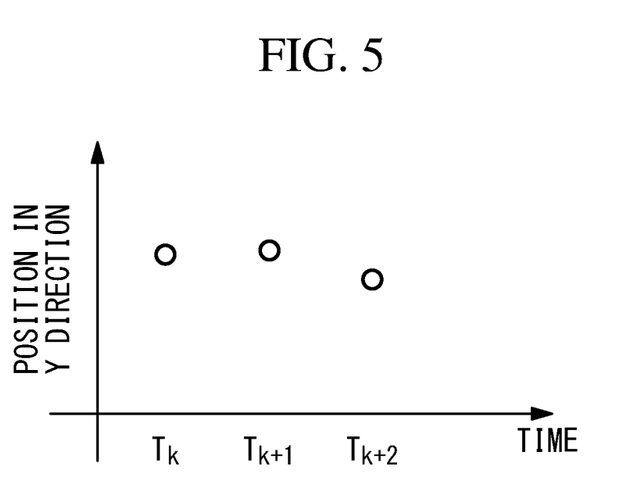
FIG. 5 is an example of the interpolation data calculated by the numerical controller of the embodiment.

The plurality of the predetermined prefetching times are, for example, prefetching times $T_{k+1}, T_{k+2}, \ldots$, which are set per every few milliseconds from the current time $T_k$. For example, as shown in FIGS. 4 and 5, the moving positions in the X direction and those in the Y direction are respectively calculated per every predetermined time.

When the moving position per every predetermined prefetching time between the cutting starting point and the cutting end point on each of the machining trajectories is calculated, a relative speed of the cutting tool T and the work W depending on the machining trajectory, cutting depth, and the like are calculated, which means that the relative speed (acceleration and deceleration interpolation) is reflected on the moving position at every predetermined prefetching time. That is to say, when the relative speed is small, a moving amount between the adjacent moving positions becomes smaller.

An interpolation data transmission program 23d is also stored in the storage unit 23. It is configured that the controller 21 is operated by the interpolation data transmission program 23d, and the controller 21 sends the prefetched position coordinate information among the calculated machining detail information, time information (corresponding prefetching time information), which corresponds to each of the plurality of the prefetched position coordinates (moving positions of the machining table 11) included in the prefetched position coordinate information, the current position coordinate information, which is the current position of the machining table 11, and its obtaining time information to the robot control unit 40 at every predestined time.

According to this embodiment, in addition to the latest current position coordinate information, the plurality of previous current position coordinate information is sent to the robot controller 41 together with the obtaining time thereof. Also, such transmission is performed per a cycle at which the numerical controller 20 calculates the machining detail information (an interpolation cycle). Note that the transmission of the information of the current time can be omitted.

The robot 30 conducts predetermined operations, such as a picking operation of the works W placed on the machining table 11 of the machine tool 10, an installing operation of the works W, machining of the works W, a deburring operation, an inspection on machined surfaces, a cleaning operation of the machine tool 10, and the like by using a tool mounted at a distal end portion of the robot 30. The robot 30 has a plurality of arm members and joints, and the robot 30 also has a plurality of servomotors 31 which respectively drive the plurality of joints (refer to FIG. 6). As the servomotors 31, every kind of servomotor such as a rotary motor, a linear motor, and the like can be used. Each of the servomotors 31 has a built-in operation position detection device such as an encoder for detecting an operation position of the servomotor 31, and detected values of the operation position detection device are sent to the robot control unit 40.

A tool 32 is mounted at the distal end portion of the robot 30, and the predetermined operations are performed by the tool 32. In this embodiment, the robot 30 is configured to perform the picking operation of the works W from the machining table 11, and as the tool 32, a chuck, which is a holding device for holding the work W, a sucking device, or the like is mounted at the distal end portion of the robot 30.

Figure 6:
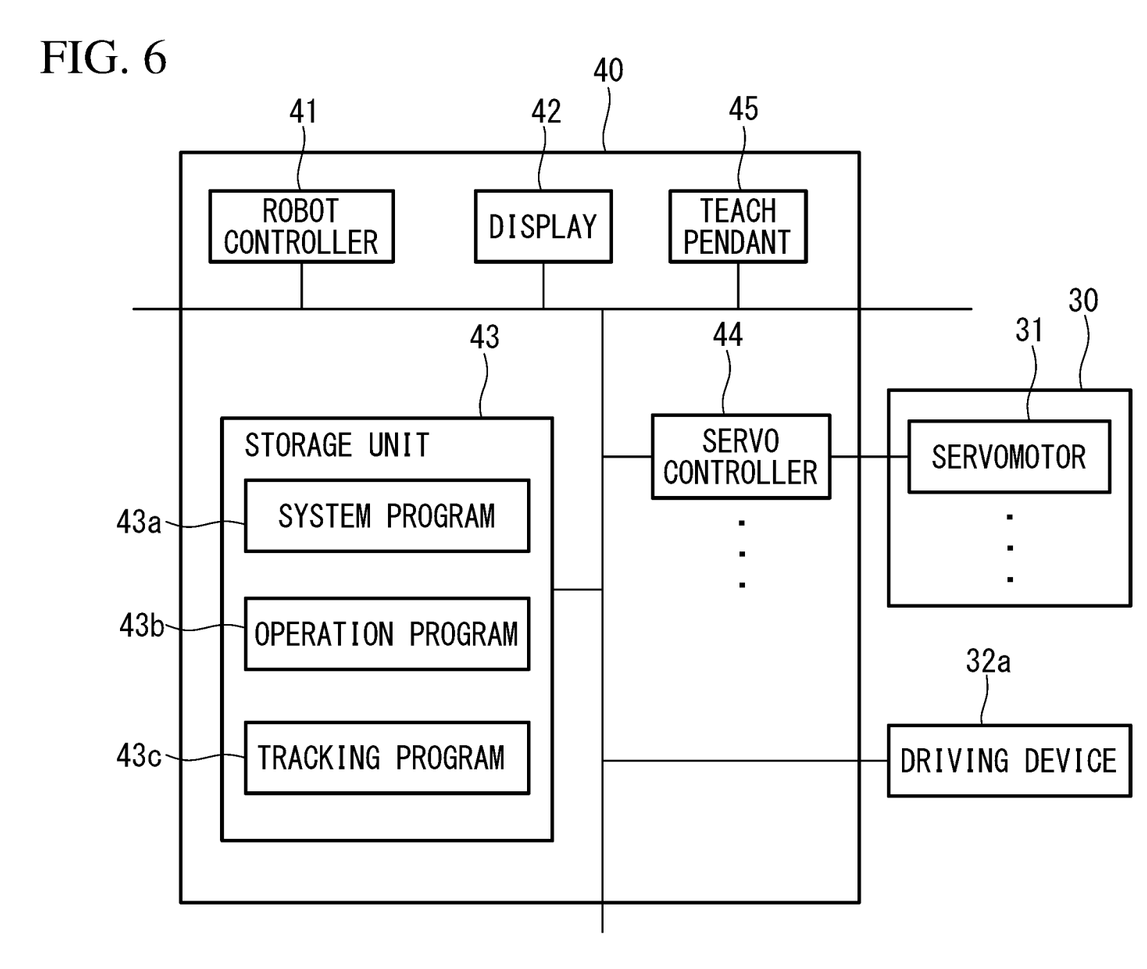
FIG. 6 is a block diagram of a robot control unit of the machining system of the embodiment.

As shown in FIG. 6, the robot control unit 40 has a robot controller 41 having, for example, CPU, RAM, and the like, a display 42, a storage unit 43 having a non-volatile storage, ROM, and the like, a plurality of servo controllers 44 which are provided so as to respectively correspond to the servomotors 31 of the robot 30, and a teach pendant 45 which is connected to the robot control unit 40 and which is portable by an operator. It may be possible to configure the teach pendant 45 so that it can conduct wireless communication with the robot control unit 40.

A system program 43a is stored in the storage unit 43, and the system program 43a provides a basic function of the robot control unit 40. Also, at least one operation program 43b is stored in the storage unit 43.

The robot controller 41 is operated by the system program 43a, reads the operation program 43b and a tracking program 43c which are stored in the storage unit 43 to temporality store them in a RAM, and sends control signals to the servo controllers 44 according to the read operation program 43b and the tracking program 43c, which control the servo amplifiers of the servomotors 31 of the robot 30 and also sends control signals to a driving device 32a of the tool 32, such as an air cylinder, and the like (refer to FIG. 6).

The robot control unit 40 recognizes a robot coordinate system which is set to the robot 30. Also, the robot control unit 40 also recognizes a machine tool coordinate system, which is set to the machine tool 10, and a coordinate correspondence relationship between the robot coordinate system and the machine tool coordinate system. For example, a calibration tool is mounted at the distal end portion of the robot 30, and the calibration tool is inserted to a first hole provided at an origin position on the machining table 11, and the calibration tool is also inserted into a second hole which is located at a position shifted in the X direction from the first hole provided in the machining table 11 so that the robot control unit 40 can recognize the machine tool coordinate system and the coordinate correspondence relationship.

The two works W are positioned on the machining table 11, the robot control unit 40 controls the robot 30 to perform the picking operation of one of the works W while the cutting tool T is cutting the other work W. In other words, the robot control unit 40 controls the robot 30 to perform the picking operation of one of the works W in a state where the machining table 11 is moving in the X direction and the Y direction so as to perform the machining operation of the other work W.

Figure 7:
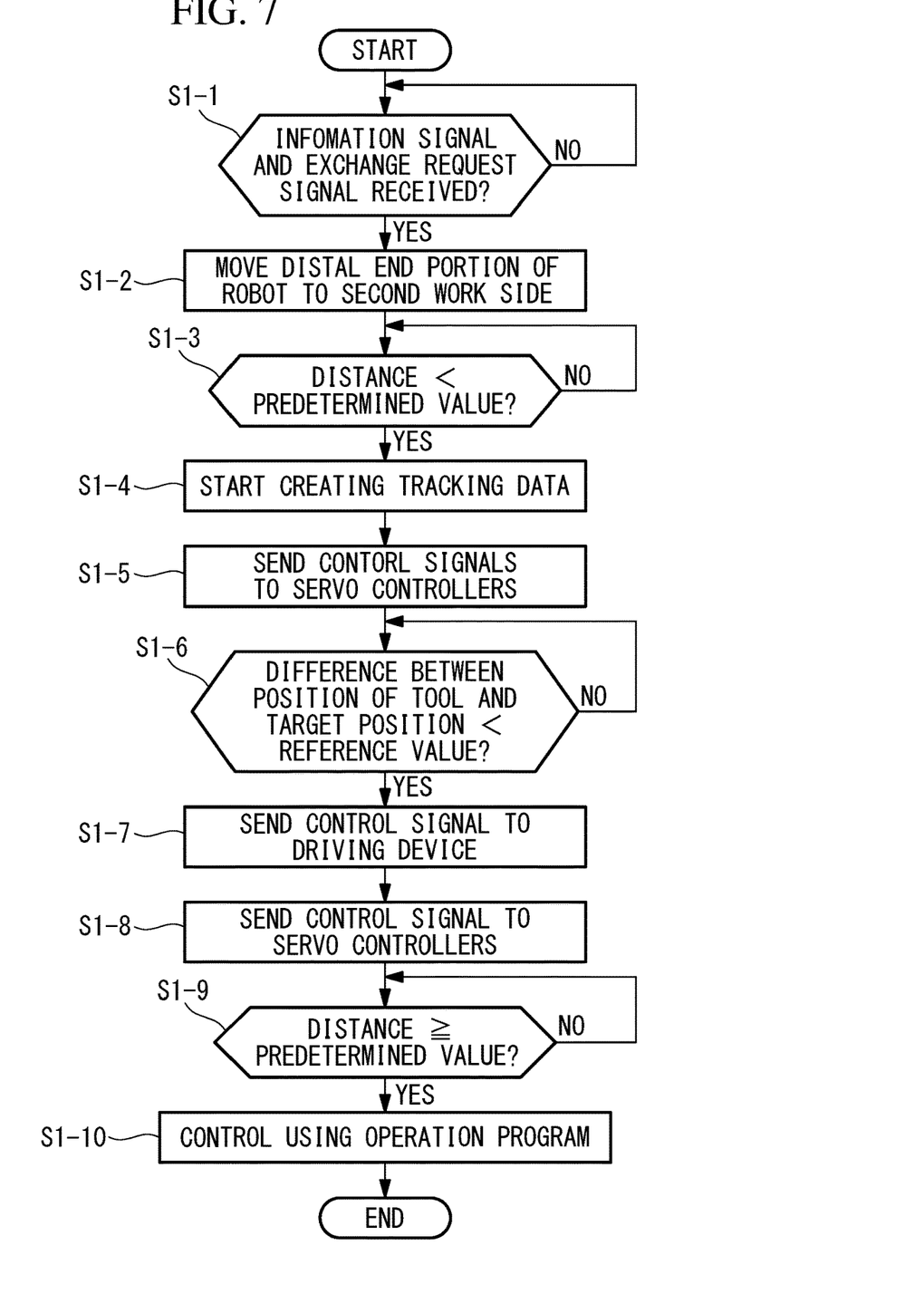
FIG. 7 is a flow chart showing an example of control by the robot control unit of the embodiment.

An example of the processes according to the operation program 43b and the tracking program 43c of the robot controller 41 will be described below, referring to FIG. 7. Here, on the machining table 11, one of the works W (hereinafter, referred to as a first work W) is positioned at the origin position, and another one of the works W (hereinafter, referred to as a second work W) is positioned at a position which is apart from the origin position by a predetermined distance toward a X-axis direction, for example, the second work W is positioned at a position which is 200 mm apart from the origin position. A relative position of the first work W and the second work W, which are on the machining table 11 (relative position information of the works), is sent to the robot control unit 40 from the numerical controller 20, and is stored in the storage unit 43 of the robot control unit 40.

After the machining process of the second work W is completed, and the machining process of the first work W is started, and when the robot controller 41 receives an information signal, which informs information of the machining of the work W, and an exchange request signal, which requests to exchange the second work W, from the controller 21 (S1-1), the robot controller 41 moves the distal end portion of the robot 30 to the second work W side according to the operation program 43b (S1-2).

When a distance between the distal end portion of the robot 30 and the machining table 11 becomes shorter than a predetermined value (S1-3), the robot control unit 41 starts to create tracking data (described below) for making the distal end portion of the robot 30 follow the movement of the machining table 11 according to the tracking program 43c (S1-4). And, the robot controller 41 uses the created tracking data and the operation program 43b, and starts to send the control signals to the servo controllers 44 so that the tool 32 mounted at the distal end portion of the robot 30 is placed at a position capable of holding the second work W in a state where the distal end portion of the robot 30 is following the movement of the machining table 11 (S1-5).

And, when the tool 32 is placed at a position capable of holding the second work W, in other words, when an absolute value of a difference between the position of the tool 32 and the destination position becomes smaller than a predetermined value (S1-6), the robot controller 41 sends control signals to the driving device 32a so that the second work W is held by the tool 32 in a state where the distal end portion of the robot 30 is following the movement of the machining table 11 (S1-7). Subsequently, the robot control unit 41 sends the control signals to the servo controllers 44 so that the held second work W is picked by the robot 30 in a state where the distal end portion of the robot 30 is following the movement of the machining table 11 (S1-8).

For example, in Steps S1-5 to S1-8, the movements of the distal end portion of the robot 30 in the X direction and the Y direction are controlled according to the tracking data, and the movement of the distal end portion of the robot 30 in the Z direction and the movement of the tool 32 are controlled according to the operation program 43. Also, when the distance between the distal end portion of the robot 30 and the machining table 11 exceeds a predetermined value (S1-9), the movements of the distal end portion of the robot 30 and the movement of the tool 32 are controlled by using the operation program 43b only (S1-10). By this, the held second work W is placed at a predetermined work storage place.

Also, after the machining of the first work W has been completed, and the machining of the second work W has been started, the first work W is picked by the robot 30 as is the case with the second work W, which is picked by the robot 30.

For example, the operation program 43b is created so that the distal end portion of the robot 30 is moved to the machining table 11 side, the work W on the machining table 11 is held by the tool 32, and the held work W is picked from the machine tool 10 in a state where the movement the machining table 11 is suspended. Therefore, as described above, by using the operation program 43b and the tracking data when the distal end portion of the robot 30 approaches to the work W, the work W is held by the tool 32 mounted at the distal end portion of the robot 30, and the held work W is picked from the machine tool 10, while the distal end portion of the robot 30 is following the movement of the machining table 11.

Figure 8:
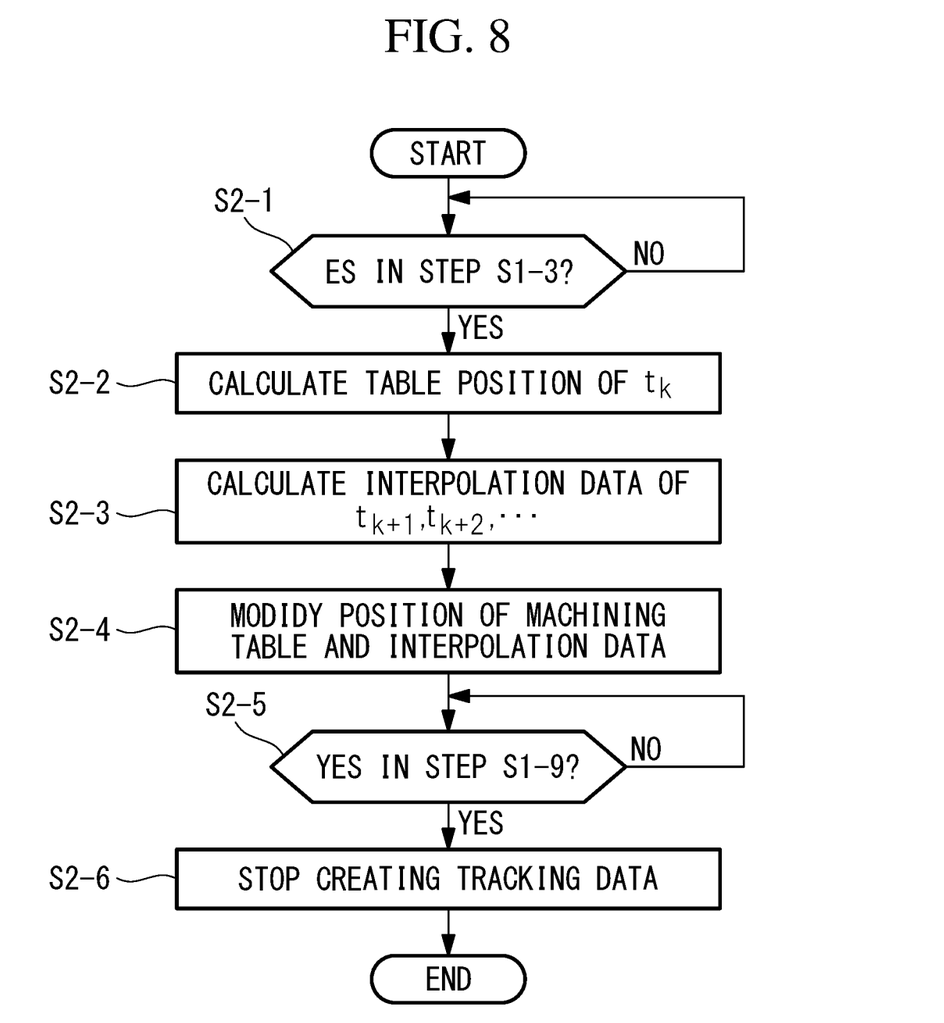
FIG. 8 is a flow chart showing an example of control by the robot control unit of the embodiment.

An example of the processes of the robot controller 41 according to the tracking program 43c when creating the tracking data will be described below, referring to FIG. 8.

Firstly, when YES is determined in Step S1-3 (S2-1), the robot controller 41 calculates the position of the table at the current time $t_k$ at each interpolation cycle (S2-2), and also calculates interpolation data of the positions of the table at the prefetching times $t_{k+1}$, $t_{k+2}$ ... at each interpolation cycle (S2-3) according to the current position coordinate information, information of obtaining time thereof, prefetched position coordinate information, and corresponding prefetching time information, which are sent from the numerical controller 20. In this embodiment, the interpolation cycle of the robot controller 41 is longer than that of the controller 21 of the numerical controller 20, however, it is not limited thereto.

Figure 9:
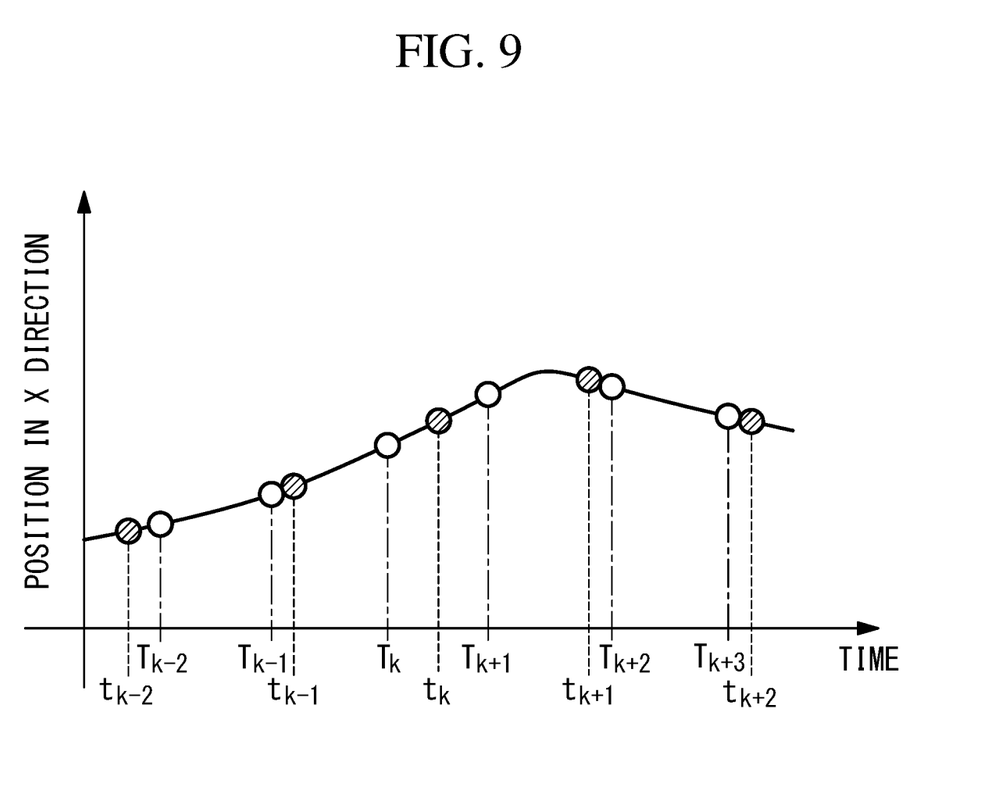
FIG. 9 shows an example of interpolation data calculated by the robot control unit of the embodiment.

A calculation example of the position of the machining table 11 in the X direction is shown in FIG. 9. In FIG. 9, the position of the machining table 11 in the X direction at an obtaining time $T_k$ is plotted according to the latest current position coordinate information and the obtaining time thereof, which is sent from the numerical controller 20. With consideration that it requires time to carry out the sending process, the receiving process, and the like, the obtaining time $T_k$ is time in the past relative to the current time $t_k$ in the robot controller 41. A delay amount of the obtaining time $T_k$ relative to the current time $t_k$ can be set as being a certain period of time, for example.

In FIG. 9, a position at immediately previous obtaining time $T_{k-1}$, and a position at the second previous obtaining time $T_{k-2}$ are also plotted.

Whereas, according to the prefetched position coordinate information, positions of the machining table in the X direction at the prefetching times $T_{k+1}$, $T_{k+2}$, $T_{k+3}$ are plotted in FIG. 9 as well.

It is possible to calculate the position of the machining table in the X direction at the current time $t_k$ by using the position information of the machining table 11 at the obtaining times $T_k$, $T_{k-1}$, $T_{k-2}$ and the position information of the machining table 11 at the prefetching times $T_{k+1}$, $T_{k+2}$, $T_{k+3}$, creating an approximate curve and the like, for example. Similarly, it is possible to calculate the position in the X direction at past times $t_{k-1}$, $t_{k-2}$.

Whereas, the positions of the approximate curves, and the like, of the prefetching times $t_{k+1}$, $t_{k+2}$ relative to the current time $t_k$ can be used as the interpolation data of the prefetching times $t_{k+1}$, $t_{k+2}$ for controlling the robot. It is possible to create high precision tracking data by calculating the interpolation data from the position information including the times in the past and the future times.

The above described process is performed on the machining table 11 in the X direction, however, the process can be performed on the machining table 11 in the Y direction as well.

Next, the robot controller 41 modifies the position of the machining table 11 at the current time $t_k$ and the interpolation data of the prefetching times $t_{k+1}$, $t_{k+2}$ so that they can match the robot coordinate system (S2-4). For example, the robot controller 41 changes the position of the machining table 11 at the current time $t_k$ and the interpolation data of the prefetching times $t_{k+1}$, $t_{k+2}$ by an amount depending on the coordinate correspondence relationship of the robot coordinate system and the machine tool coordinate system. Also, the robot controller 41 changes the position of the machining table 11 at the current time $t_k$ and the interpolation data of the prefetching times $T_{k+1}$, $T_{k+2}$ by an amount depending on the fact that the object to be picked is the second work W by using the work relative position. In this embodiment, the second work W is positioned at a position which is 200 mm distant from the first work W on the machining table 11 in the X direction, therefore, the modification made by the amount depending on the fact that the object to be picked is the second work W means that the modification is made by adding 200 mm in the X direction.

By this, in Steps S1-5 to S1-8, the robot controller 41 controls the positions of the distal end portion of the robot 30 in the X direction and the Y direction by using a known robot control method. At this time, the robot 30 is controlled so that the distal end portion thereof follows the second work W on the machining table 11 by using the position of the machining table 11 at the current time $t_k$, and the interpolation data of the prefetching times $t_{k+1}$, $t_{k+2}$, which are modified to match the robot coordinate system in Step 2-4.

Subsequently, when YES is determined in Step S1-9 (S2-5), the creation of the tracking data is suspended (S2-6).

In this manner, according to this embodiment, the numerical controller 20 sends the current position coordinate and the prefetched position coordinate of the machining table 11 to the robot control unit 40, and by using the received current position coordinate and prefetched position coordinate of the machining table 11, the robot control unit 40 controls the robot 30 so that the distal end portion of the robot 30 follows the movement of the machining table 11. The current position coordinate and the prefetched position coordinate of the machining table 11 are generally obtained by many of the numerical controllers 20, and the prefetched position coordinate of the machining table 11 is generally calculated by many of the numerical controllers 20 in order to conduct the machining. Therefore, it is possible to control an increase of processes of the numerical controller 20 side.

Whereas, the robot control unit 40 calculates the operation trajectory of the distal end portion of the robot 30 and carries out kinematics rerated arithmetic on the operation trajectory of the distal end portion of the robot 30 depending on the current position coordinate and the prefetched position coordinate for controlling the movement of the machining table 11 so as to calculate a target rotation angle of the servomotors 31 of respective joints in order to achieve the operation trajectory. Therefore, it is possible to perform the high precision tracking control of the robot 30. Also, even though the control cycle of the numerical controller 20 and that of the robot control unit 40 are different from each other, it is possible to perform the high precision tracking control of the robot 30.

Further, in this embodiment, the machining table 11 is configured so that the plurality of works W are positioned thereon, and the robot control unit 40 controls the robot 30 so that the distal end portion of the robot 30 follows the movement of the machining table 11 by using the relative position information of the plurality of the works, which shows the positional relation of the plurality of the works on the machining table 11.

Here, when the same machining is conducted to each of the plurality of works W on the machining table 11, the numerical controller 20 may machine the plurality of works W by using one machining program 23b without setting the machining program 23b to each of the works W in some cases. At this time, the numerical controller 20 reads the same machining program 23b for machining the works W, and shifts the position of the machining table 11 depending on the position of the work W.

In this configuration, the robot 30 is controlled so that the distal end portion of the robot 30 follows the movement of the machining table 11 by using the relative positional relation of the works, which corresponds to the shifted amount of the machining table 11, which is advantageous for controlling the increase of the processes of the numerical controller 20 side.

This embodiment shows the machining system with the plurality of the works W positioned on the machining table 11. On the other hand, the machining system may possibly be configured so that only one work W is positioned on one machining table 11. In this case, for example, it is possible to configure that the robot 30 performs a predetermined operation on the works W, which are being machined by the machine tool, by using the tool 32 mounted at the distal end portion of the robot 30 while following the movement of the machining table 11. With such configuration, the robot 30 can perform the certain operation while the machining table is moving, and without suspending the movement of the machining table 11, which is capable of shortening the cycle time, and which is advantageous for improving production efficiency.

Also, it is possible that the robot control unit 40 controls the robot 30 so that the distal end portion of the robot 30 follows the movement of the machining table 11 in a state where the machining table 11 is moving after the machining of the works W by the machine tool 10 has been completed.

With this configuration, for example, the robot 30 can perform the picking operation of the works W in a state where the machining table 11 is moving after one work W is positioned on one machining table 11, and after the machining of the works W by the machine tool 10 is completed. Therefore, the robot 30 can perform the picking operation of the works W while the machining table is kept moving, and without suspending the movement of the machining table 11, which is advantageous for shortening the cycle time.

Also, in this embodiment, as the time of the controller 21, such as the obtaining time, and the like, a counter value of the controller 21, which is counted per the interpolation cycles of the numerical controller 20, may be used, and as the time of the robot controller 41, a counter value of the robot controller 41, which is counted per the interpolation cycle of the robot control unit, may be used.

Also, it is possible to configure that the table moving apparatus 12 controls the machining table 11 to rotate around a X-axis and around a Y-axis. In this case, as is the case with the positions of the machining table 11 in the X direction and the Y direction, the numerical controller 20 sends the current position coordinate information and the prefetched position coordinate information of rotation positions of the machining table 11, which rotates around the X axis and around the Y axis, to the robot control unit 40, and the robot control unit 40 controls the distal end portion of the robot 30 so as to follow the machining table 11 by using the information as well.

Further, it may be possible to configure that the table moving apparatus 12 moves the machining table 11 in the Z direction. In this case, as is the case with the positions of the machining table 11 in the X direction and the Y direction, the numerical controller 20 also sends the current position coordinate information and the prefetched position coordinate information of the position of the machining table 11, which moves in the Z direction to the robot control unit 40, and the robot control unit 40 controls the distal end portion of the robot 30 so as to follow the machining table 11 by using the information.

Moreover, the machine tool 10 is not limited to the NC machine tool as long as the machine tool 10 has the machining table 11, whose movement is controlled by the numerical controller 20.

The following aspects of the present invention are derived from the aforementioned disclosure.

A first aspect of the present invention is a machining system including, a machine tool which processes a work positioned on a machining table; a numerical controller which stores a machining program and which moves the machining table according to the machining program; a robot which performs a predetermined process on the work which are processed by the machine tool; and a robot control unit which controls the robot, wherein the numerical controller is configured to obtain current position coordinates of the machining table, and calculates prefetched position coordinates of the machining table at a prefetching time by prefetching the machining program and carrying out an acceleration and deceleration interpolation while the machining table is moving, and which sends, to the robot control unit, the current position coordinates, the prefetched position coordinates, and information of times which respectively correspond to the current position coordinates and the prefetched position coordinates, and the robot control unit controls the robot so that a distal end portion of the robot follows movement of the machining table by using the current position coordinates, the prefetched position coordinates, and the information of the times, which the robot control unit receives from the numerical controller.

In this embodiment, the numerical controller sends the current position coordinates and the prefetched position coordinates of the machining table to the robot control unit, and the robot control unit controls the robot so that the distal end portion of the robot follows the movement of the machining table by using the received current position coordinates and the prefetched position coordinates of the machining table. The current position coordinates of the machining table is generally obtained by many of the numerical controllers, and the prefetched position coordinates of the machining table is generally calculated by many of the numerical controllers in order to conduct the machining. Accordingly, it is capable of restraining increase of processes of the numerical controller side. Either one of a target position or a position measured by a sensor may be used as the current position coordinate of the machining table.

Whereas, the robot control unit calculates an operation trajectory of the distal end portion of the robot and carries out kinematics rerated arithmetic on an operation trajectory of the distal end portion of the robot depending on the current position coordinates and the prefetched position coordinates, which are used for controlling the movement of the machining table, so as to calculates rotation angles of the motors of the joints for achieving the operation trajectory. By this, it is possible to achieve the high precise tracking control of the robot. Also, in addition to the position coordinates, the time information is also sent from the numerical controller, therefore, it is possible to consider changes with time occurred to the position coordinates at the robot control unit side so that the tracking control of the robot can be performed even when control cycles of the numerical controller and the robot control unit are different from each other.

With the above aspect, it is preferable that the machining table is configured to position a plurality of the works on the machining table, and the robot control unit controls the robot so that the distal end portion of the robot follows the movement of the machining table by using relative position information of the works, the relative position information shows a positional relationship of the plurality of the works on the machining table.

Here, when the same machining process is conducted to each of the works on the machining table, the plurality of the works may be machined by using one machining program without setting the machining program to each of the works in the numerical controller. At this time, the numerical controller reads the same machining program for machining the works, and shifts the position of the machining table depending on the position of the work.

With the above configuration, the robot is controlled so that the distal end portion of the robot follows the movement of the machining table by using the relative position information of the works corresponding to the shifted amount, which is advantageous for controlling the increase of the processes of the numerical controller side.

With the above aspect, preferably, the robot performs a predetermined process to the work which is being processed by the machine tool, while the robot is following the movement of the machining table, by using a tool mounted at the distal end portion of the robot.

With this configuration, it is possible that the robot performs the predetermined process concurrently with the machining table is kept moving, and without suspending the movement of the machining table, which enables shortening cycle time, and which is advantageous for improving production efficiency.

With the above aspect, preferably, the robot control unit controls the robot so that the distal end portion of the robot follows the movement of the machining table in a state where the machining table is moving after processes for the work by the machine tool is completed.

With this configuration, after one work is positioned on the machining table, and after the machining of the work by the machine tool has been completed, and also in a state where the machining table is moving, the picking operation of the work, for example, can be performed by the robot while keeping the movement of the machining table, and without suspending the movement of the machining table, which is advantageous for shortening the cycle time.

With the above aspect, preferably, the robot control unit controls the robot so that the distal end portion of the robot follows the movement of the machining table by using the current position coordinates, the prefetched position coordinates, which are received from the numerical controller, and the information of the times which respectively correspond to the current position coordinates and the prefetched position coordinates, and further using previously received position coordinates and its information of time.

With this configuration, the robot control unit uses the current position coordinates, the prefetched position coordinates, the time information thereof, and further uses the previously received position coordinates, and the time information thereof. Therefore, it is possible to improve the calculation efficiency for calculating the operation trajectory of the distal end portion of the robot in order to follow the machining table, which is advantageous for achieving the high precision tracking control of the robot.

Advantageous Effects of Invention

According to the aforementioned aspects, it is not necessarily required to make internal clocks of a machine tool and a robot correspond to a reference clock, and the robot can follow the machine tool with high precision without using a dedicated synchronizing device such as an interference checking device and the like, and in addition, the robot can perform the predetermined process on a machining table while the machining table is kept moving without suspending the movement of the machining table, which is advantageous for shortening cycle time.

REFERENCE SIGNS LIST 10 machine tool
11 machining table
12 table moving apparatus
13 tool driving device
20 numerical controller
21 controller
23 storage unit
23a system program
23b machining program
23c machining control program
23d interpolation data transmission program
30 robot
31 servomotor
32 tool
32a driving device
40 robot control unit
41 robot controller
43 storage unit
43a system program
43b operation program
43c tracking program
44 servo controller
T cutting tool
W work
L1 machining trajectory
L2 trajectory

The invention claimed is:

1. A machining system comprising:
a machine tool which processes a work positioned on a machining table;
a numerical controller which stores a machining program and which moves the machining table according to the machining program;
a robot which performs a predetermined process on the work which are processed by the machine tool;
a robot control unit which controls the robot;
wherein the numerical controller is configured to obtain current position coordinates of the machining table, and calculates prefetched position coordinates of the machining table at a prefetching time by prefetching the machining program and carrying out an acceleration and deceleration interpolation while the machining table is moving, and which sends, to the robot control unit, the current position coordinates, the prefetched position coordinates, and information of times which respectively correspond to the current position coordinates and the prefetched position coordinates; and
wherein the robot control unit creates
tracking data for making a distal end portion of the robot follow movement of the machining table that moves from the current position coordinates to the prefetched position coordinates of the prefetching time by using the current position coordinates, the prefetched position coordinates calculated by the numerical controller, and the information of the times, which the robot control unit receives from the numerical controller, and the robot control unit controls the robot so that the robot follows the movement of the machining table by using the tracking data.

2. A machining system comprising:
a machine tool which processes a work positioned on a machining table;
a numerical controller which stores a machining program and which moves the machining table according to the machining program;
a robot which performs a predetermined process on the work which are processed by the machine tool; and
a robot control unit which controls the robot, wherein
the numerical controller is configured to obtain current position coordinates of the machining table, and calculates prefetched position coordinates of the machining table at a prefetching time by prefetching the machining program and carrying out an acceleration and deceleration interpolation while the machining table is moving, and which sends, to the robot control unit, the current position coordinates, the prefetched position coordinates, and information of times which respectively correspond to the current position coordinates and the prefetched position coordinates, the robot control unit controls the robot so that a distal end portion of the robot follows movement of the machining table by using the current position coordinates, the prefetched position coordinates, and the information of the times, which the robot control unit receives from the numerical controller, the machining table is configured to position a plurality of the works on the machining table; and the robot control unit controls the robot so that the distal end portion of the robot follows the movement of the machining table by using relative position information of the works, the relative position information shows a positional relationship of the plurality of the works on the machining table.

3. A machining system comprising:

a machine tool which processes a work positioned on a machining table;

a numerical controller which stores a machining program and which moves the machining table according to the machining program;

a robot which performs a predetermined process on the work which are processed by the machine tool; and a robot control unit which controls the robot, wherein the numerical controller is configured to obtain current position coordinates of the machining table, and calculates prefetched position coordinates of the machining table at a prefetching time by prefetching the machining program and carrying out an acceleration and deceleration interpolation while the machining table is moving, and which sends, to the robot control unit, the current position coordinates, the prefetched position coordinates, and information of times which respectively correspond to the current position coordinates and the prefetched position coordinates, the robot control unit controls the robot so that a distal end portion of the robot follows movement of the machining table by using the current position coordinates, the prefetched position coordinates, and the information of the times, which the robot control unit receives from the numerical controller, and the robot performs a predetermined process to the work which is being processed by the machine tool, while the robot is following the movement of the machining table, by using a tool mounted at the distal end portion of the robot.

4. The machining system according to claim 1, wherein the robot control unit controls the robot so that the distal end portion of the robot follows the movement of the machining table in a state where the machining table is moving after processes for the work by the machine tool is completed.

5. A machining system comprising:

a machine tool which processes a work positioned on a machining table;

a numerical controller which stores a machining program and which moves the machining table according to the machining program;

a robot which performs a predetermined process on the work which are processed by the machine tool; and a robot control unit which controls the robot, wherein the numerical controller is configured to obtain current position coordinates of the machining table, and calculates prefetched position coordinates of the machining table at a prefetching time by prefetching the machining program and carrying out an acceleration and deceleration interpolation while the machining table is moving, and which sends, to the robot control unit, the current position coordinates, the prefetched position coordinates, and information of times which respectively correspond to the current position coordinates and the prefetched position coordinates, the robot control unit controls the robot so that a distal end portion of the robot follows movement of the machining table by using the current position coordinates, the prefetched position coordinates, and the information of the times, which the robot control unit receives from the numerical controller, and the robot control unit controls the robot so that the distal end portion of the robot follows the movement of the machining table by using the current position coordinates, the prefetched position coordinates, which are received from the numerical controller, and the information of the times which respectively correspond to the current position coordinates and the prefetched position coordinates, and further using previously received position coordinates and its information of time.

* * * * *